2 Sheets--Sheet 1

J. B. WHEELER.
Grain-Drier.

No. 6,307. Reissued Feb. 23, 1875.

WITNESSES.

Geo. G. Sumner

J. S. Lawrence

INVENTOR.

J. B. Wheeler

A. S. Merriman & Co ATTORNEYS.

2 Sheets--Sheet 2.

J. B. WHEELER.

Grain-Drier.

No. 6,307. Reissued Feb. 23, 1875.

WITNESSES.

Geo. G. Samuel

D. S. Lawrence.

INVENTOR.

Jesse B. Wheeler

A. L. Merriman & Co. ATTORNEYS

UNITED STATES PATENT OFFICE.

JESSE B. WHEELER, OF BOLTON, MASSACHUSETTS, ASSIGNOR, BY MESNE ASSIGNMENTS, TO JAMES A. MALONEY, OF GEORGETOWN, D. C.

IMPROVEMENT IN GRAIN-DRIERS.

Specification forming part of Letters Patent No. 38,191, dated April 14, 1863; reissue No. 6,307, dated February 23, 1875; application filed February 10, 1875.

*To all whom it may concern:*

Be it known that I, JESSE B. WHEELER, of Bolton, in the county of Worcester and State of Massachusetts, have invented a new and useful Improvement in Machines for Drying, Cooling, and Cleaning Grain, Flour, Meal, and other similar articles; and I do hereby declare the following to be a full, clear, and exact description of the same, reference being had to the accompanying drawings, making a part of this specification, in which—

Figure 1:
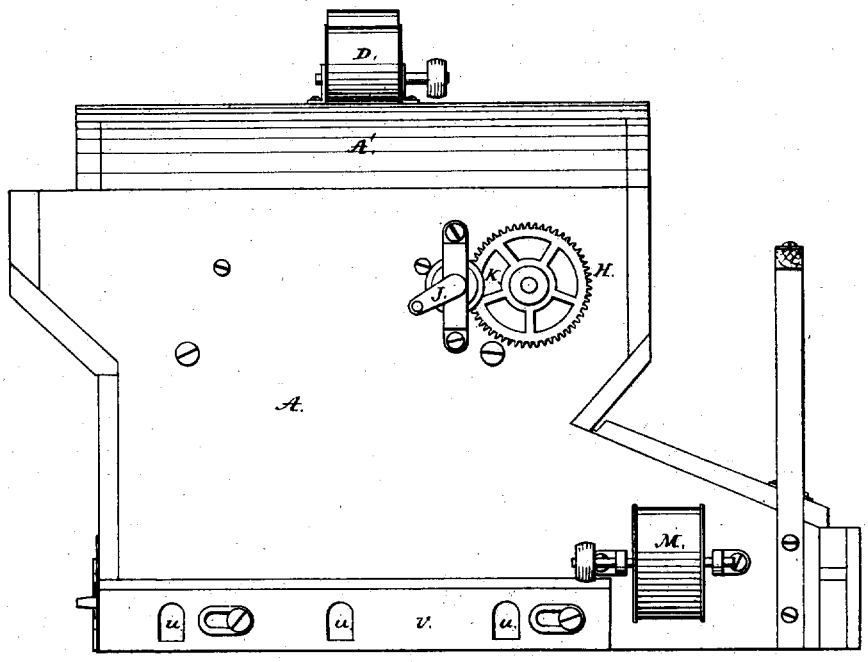
Figure 2:
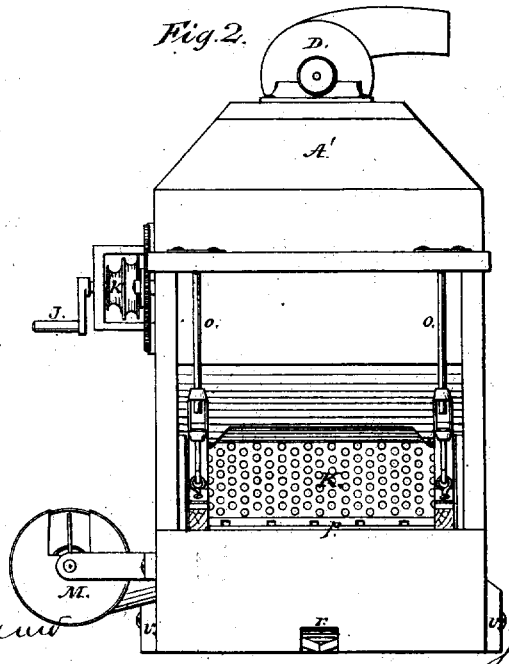
Figure 3:
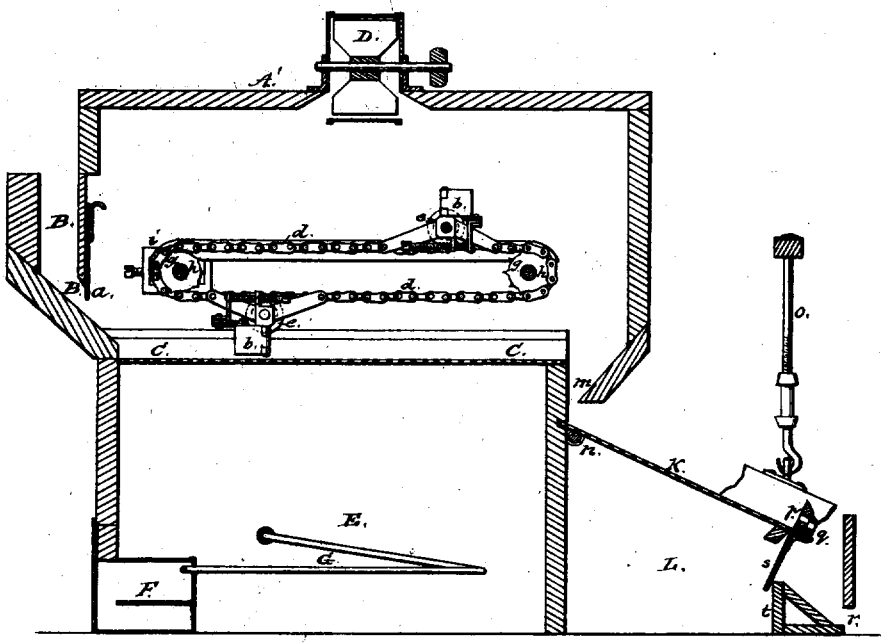
Figure 4:
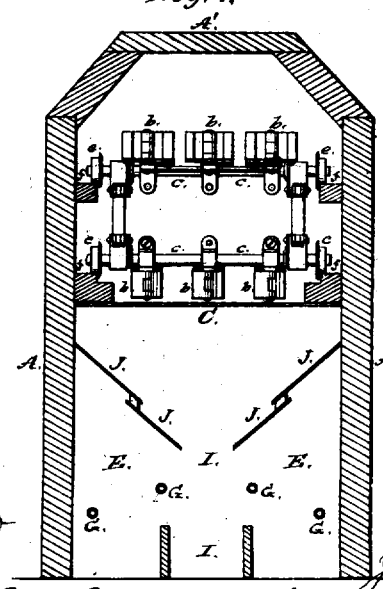
Figure 5:
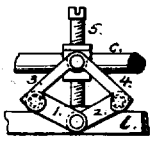

Figure 1 represents a side elevation of the machine. Fig. 2 represents an end view thereof. Fig. 3 represents a vertical, longitudinal, and a central section through the machine. Fig. 4 represents a vertical transverse section; and Fig. 5 represents, on an enlarged scale, one of the stirrers and its connections and mode of adjustment.

Similar letters of reference, where they occur in the several figures, denote like parts of the apparatus in all the drawings.

To enable others skilled in the art to make and use this invention, I will proceed to describe the same with reference to the drawings.

A represents an air-tight case, which is furnished with suitable air inlet and exit passages, commanded by valves or registers, as will be hereinafter explained. At one end of this case there is a hopper or feeding-passage, B, the entire width of the screen, and commanded by a slide, *a*, by which said passage may be enlarged or diminished, as it may be desirable to feed in the grain or other material to be dried, cooled, and cleaned, in greater or less quantities. The material having passed through the feed-passage B, drops upon one end of a perforated bottom, C, through the perforations of which heated or dried air is drawn by an exhaust-fan, D, arranged on top of the cover A′ of the case. The air thus drawn through the perforated bottom, and through the grain or other material passed along over it, is heated in a chamber, E, in the lower part of the case, by the heaters F and the flue-pipes G, extending therefrom through the said chamber E, the exhaust-fan creating the draft by which it circulates through the grain, &c. This heated air becomes charged with the moisture that it takes up from the grain, &c., and when expelled by the fan other heated air takes its place and becomes surcharged with moisture, and so on. The grain, &c., is stirred and advanced over the perforated bottom C, by means of adjustable arms or stirrers *b*, arranged on cross-shafts *c*, that are united at their ends to endless traveling chains or belts *d* at the sides of the case, these chains having guide-wheels *e e*, that run on ways *f* connected to the sides of the case, and also sprocket-wheels *g*, around which they move, the sprocket-wheels being on shafts *h*, whose bearings run in adjustable boxes *i*, so as to keep the chains properly strained up. On the outside of the case there may be a crank, *j*, or a pulley, *k*, through or by means of which and of a pinion on their shaft, motion is communicated to the cog wheel H, on one of the shafts *h*, and through this shaft to the endless chains and stirrers and movers thereon, for advancing and stirring the grain, &c. The stirrers, as more distinctly seen in Fig. 5, are composed of four arms, 1 2 3 4, hinged to each other and connected to the shaft *c*, and to a bar, *l*, so that by means of a set-screw, 5, the arms 3 4 may be moved apart or drawn toward each other, to present more or less moving surface to the grain or other material being dried, cooled, and cleaned; and these stirrers and movers may be run at a greater or less velocity for a similar purpose, viz., of advancing more or less rapidly the grain or other material over the perforated bottom and through the air-chamber. Any dirt, or other impure matter heavy enough to pass through the perforated bottom, drops or is conducted through the open space I by the inclined overlapping hopper or deflecting boards J, whence it can be removed through a door at the end of the case, while the dust or impurities that rise above the perforated bottom are drawn out by the exhaust-fan D, so that it is also a cleansing, as well as a drying and cooling-process.

The grain, &c., having been dried and passed over the bottom C by means of the stirrers and movers *b*, drops through the passage *m* onto a perforated apron, K, which is hinged at its upper end, as at *u*, and can be raised or lowered at its lower end by the swivel-rods *o o*. The object in raising and lowering this apron K, is to give the apron such an inclination only as will allow the grain or other material to slide or move over it by its own gravity, and to hasten or retard it, as the case may be.

At the lower end of the apron K there are boards *p q*, furnished with openings, one of these, *q*, being so arranged by slots and set-screws as that it may be moved register-fashion upon the other, *p*, to open or close the passages through them, and thus limit the passage of the grain or other material through them. When the passages are closed, then the grain, &c., must pass over the top of the board *p*, and thence through the exit-passage *r* of the machine.

Underneath the apron K there is a cold-air chamber, L, into which the cool air is blown by a fan-blower, M, and thence this air rises up through the perforated bottom, and through the material passing over it, which cools it.

At the lower end and under side of the apron K there is a hinged valve, *s*, which rests against the part *t* of the frame. This valve, as the apron is raised or lowered, keeps the space under the apron closed, so that the only escape for the cool air out of the chamber L is through the perforations in the apron K.

The main chamber E is furnished with air through the openings *u*, Fig. 1, which are commanded by a register, *v*, to regulate the quantity introduced.

All the inlet and exit openings or passages are controlled by slides, valves, or registers, except that, *m*, which is not so material; but even this may be commanded, if necessary, by a slide or valve.

Having thus fully described my invention, what I claim as new, and desire to secure by Letters Patent, is—

1. In combination with the heated-air chamber E, perforated bottom C, and the stirring and moving arms traversing over it, the exhaust-fan D, for drawing the heated air up through the grain or other material, and through the machine, substantially as described.

2. In combination with the hinged apron K, overlying the cool-air chamber L, the raising and lowering rods *o o*, and hinged valve *s*, substantially as described, so that said apron may be raised or adjusted without opening the chamber L, as specified.

3. The stirring and moving mechanism, consisting, essentially, of the hinged and adjustable arms *b b*, moved by endless chains, substantially as herein described, and for the purposes set forth.

4. In a machine for drying, cleaning, and purifying grain, meal, flour, and similar materials, the combination of a horizontal screen, forming a diaphragm within a rectangular air-tight case, an exhaust-fan and discharge connected with the upper portion of said case, a feed-hopper and regulator to feed the material into the machine the entire width of the screen, and of even depth, and means for agitating and moving the material in one direction, while the air drawn up by the fan passes in another direction, and hopper beneath said screen having inclined overlapping surfaces, all substantially as and for the purpose set forth.

JESSE B. WHEELER. [L. S.]

In presence of—
GEO. G. SUMNER,
J. S. LAWRENCE.